United States Patent
Goodman

(10) Patent No.: US 8,994,818 B2
(45) Date of Patent: Mar. 31, 2015

(54) METHOD AND APPARATUS FOR DETECTING MINIMUM POST SPACING IN IMAGING APPLICATIONS

(75) Inventor: Vernon R. Goodman, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 426 days.

(21) Appl. No.: 13/558,543

(22) Filed: Jul. 26, 2012

(65) Prior Publication Data

US 2014/0028834 A1 Jan. 30, 2014

(51) Int. Cl.
| | |
|---|---|
| *H04N 7/18* | (2006.01) |
| *G01S 7/497* | (2006.01) |
| *G01S 17/89* | (2006.01) |
| *G01S 17/42* | (2006.01) |

(52) U.S. Cl.
CPC ............... *G01S 17/89* (2013.01); *G01S 7/497* (2013.01); *G01S 17/42* (2013.01)
USPC .......................................................... 348/135

(58) Field of Classification Search
USPC .................. 348/135, 136; 382/173, 103, 154; 356/28.5, 4.5
See application file for complete search history.

(56) References Cited

U.S. PATENT DOCUMENTS

| | | | | |
|---|---|---|---|---|
| 6,552,842 | B2 * | 4/2003 | Simpson et al. | 359/318 |
| 7,312,855 | B1 * | 12/2007 | Hintz et al. | 356/4.01 |
| 8,249,346 | B2 * | 8/2012 | Dammann | 382/173 |
| 8,712,147 | B2 * | 4/2014 | Rahmes et al. | 382/154 |
| 8,805,075 | B2 * | 8/2014 | Goodman et al. | 382/173 |
| 8,885,883 | B2 * | 11/2014 | Goodman | 382/103 |
| 2004/0109483 | A1 * | 6/2004 | Simpson et al. | 372/39 |
| 2013/0021342 | A1 * | 1/2013 | Goodman | 345/424 |
| 2014/0158883 | A1 * | 6/2014 | Zewail | 250/305 |

OTHER PUBLICATIONS

Marius A. Albota, et al., "Three-dimensional imaging laser radar with a photon-counting avalanche photodiode array and microchip laser", Applied Optics, vol. 41, No. 36, Dec. 20, 2002, p. 7671-7678.
Pratt, "Digital Image Processing", Wiley Interscience, NY, 1991, p. 437-440.
Kreyszig, "Advanced Engineering Mathematics", John Wiley & Sons, NY, 4th Edition, 1979, p. 879-893.

* cited by examiner

*Primary Examiner* — Paulos M Natnael

(57) ABSTRACT

A method includes receiving image data obtained by a laser imaging system. The method also includes identifying a minimum post spacing obtainable in a three-dimensional image constructed using the image data. The minimum post spacing defines a maximum obtainable resolution of the image. Identifying the minimum post spacing includes using (i) multiple point spread functions associated with the image data and (ii) a number of laser pulses directed at a specified area by the imaging system during capture of the image data. Identifying the minimum post spacing may also include using (iii) a minimum contrast ratio associated with the image. The point spread functions may be associated with different point reflectors, have a Gaussian distribution, and overlap.

20 Claims, 5 Drawing Sheets

Contrast Ratio (c) = a/b
Post spacing = p

METHOD AND APPARATUS FOR DETECTING MINIMUM POST SPACING IN IMAGING APPLICATIONS

TECHNICAL FIELD

This disclosure is generally directed to image processing systems. More specifically, this disclosure relates to a method and apparatus for detecting minimum post spacing in imaging applications.

BACKGROUND

Various types of imaging systems can be used to capture three-dimensional images of objects or environments. For example, a coherent or linear mode Laser Detection and Ranging (LADAR) system uses a laser to illuminate an area and a detector to capture precise measurements of radiation that reflects from the area. LADAR systems can be used to capture images of various objects, including non-metallic objects. The use of narrow laser beams allows LADAR systems to survey or map objects or environments at very high resolutions.

Measurement data captured by a LADAR system can be analyzed to create images that may be viewed by a user. The same measurement data can be processed in different ways to create images of different resolutions. Ordinarily, the user views one image created by the processing system, determines if a higher resolution is needed or desired, and causes the processing system to reprocess the measurement data to try and obtain a higher-resolution image. At some point, however, additional processing fails to improve the resolution and can actually result in lower-resolution images. Unfortunately, the processing needed to create each image can be intensive, and the user typically cannot know at what point the highest resolution is reached and additional processing fails to improve the resolution. It can therefore take a lengthy period of time for the user to obtain a desired high-resolution image.

SUMMARY

This disclosure provides a method and apparatus for detecting minimum post spacing in imaging applications.

In a first embodiment, a method includes receiving image data obtained by a laser imaging system. The method also includes identifying a minimum post spacing obtainable in a three-dimensional image constructed using the image data. The minimum post spacing defines a maximum obtainable resolution of the image. Identifying the minimum post spacing includes using (i) multiple point spread functions associated with the image data and (ii) a number of laser pulses directed at a specified area by the imaging system during capture of the image data.

In a second embodiment, an apparatus includes at least one memory device configured to store image data obtained by a laser imaging system. The apparatus also includes at least one processing system configured to identify a minimum post spacing obtainable in a three-dimensional image constructed using the image data. The minimum post spacing defines a maximum obtainable resolution of the image. The at least one processing system is configured to identify the minimum post spacing using (i) multiple point spread functions associated with the image data and (ii) a number of laser pulses directed at a specified area by the imaging system during capture of the image data.

In a third embodiment, a non-transitory computer readable medium embodies a computer program. The computer program includes computer readable program code for obtaining image data from a laser imaging system. The computer program also includes computer readable program code for identifying a minimum post spacing obtainable in a three-dimensional image constructed using the image data. The minimum post spacing defines a maximum obtainable resolution of the image. The computer readable program code for identifying the minimum post spacing includes computer readable program code for using (i) multiple point spread functions associated with the image data and (ii) a number of laser pulses directed at a specified area by the imaging system during capture of the image data.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
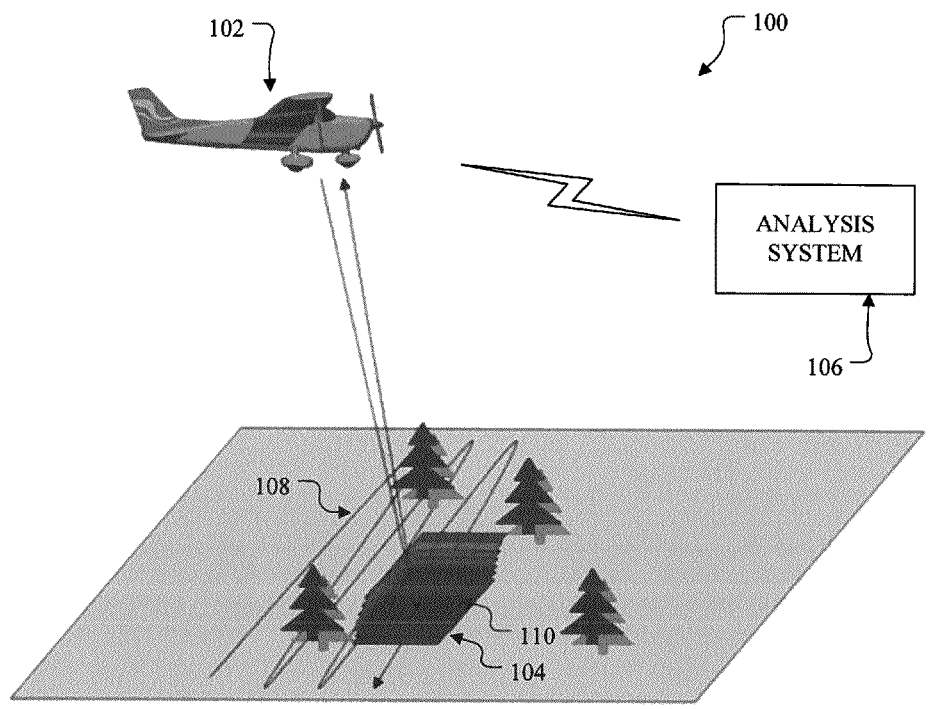
FIG. 1 illustrates an example LADAR system in accordance with this disclosure.

FIG. 1 illustrates an example LADAR system 100 in accordance with this disclosure. As shown in FIG. 1, a laser platform 102 includes at least one laser that directs radiation towards a given area 104 and at least one sensory array that receives reflections of that radiation from the given area 104. The platform 102 includes any suitable structure on which at least one laser and at least one sensory array can be placed. In this example, the platform 102 includes an airplane, although other platforms (such as a satellite, unmanned drone, or other vehicle) could be used.

The given area 104 represents any suitable area being scanned using the laser platform 102. The given area 104 could include zero or more objects, such as vehicles. Any objects in the given area 104 may be visible or obscured, such as when an object is located under trees or other foliage or is otherwise camouflaged. The given area 104 can have any suitable size, shape, and dimensions and can represent an area in any given environment.

The laser platform 102 directs radiation towards the given area 104 and receives radiation reflected from the given area 104. By performing calculations such as time-of-flight calculations, it is possible to construct one or more three-dimensional images of the given area 104. The analysis can be done by a processing system on the platform 102 itself, or the analysis could be done remotely, such as by an analysis system 106. The analysis system 106 could receive measurement data or other data from the platform 102 in any suitable manner, such as via satellite or other wireless communications. The analysis system 106 includes any suitable computing or other data processing system that analyzes data and creates three-dimensional images of the given area 104.

Figure 2:
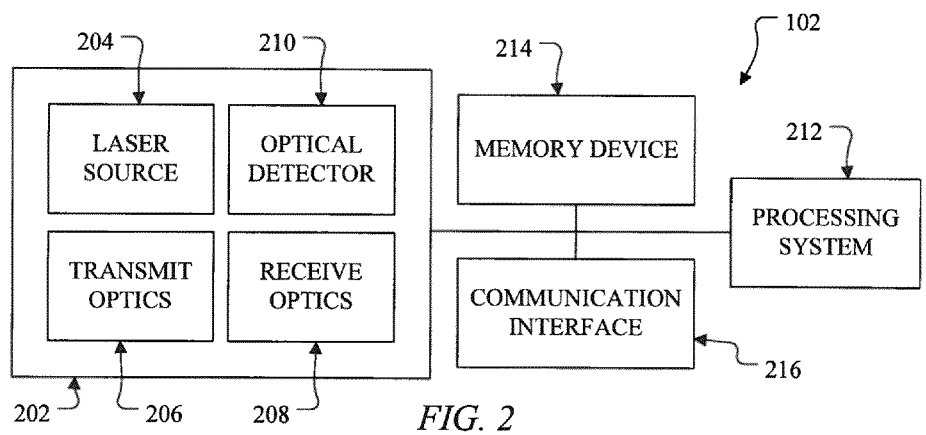
FIGS. 2 and 3 illustrate example components in the LADAR system of FIG. 1 in accordance with this disclosure.
Figure 3:
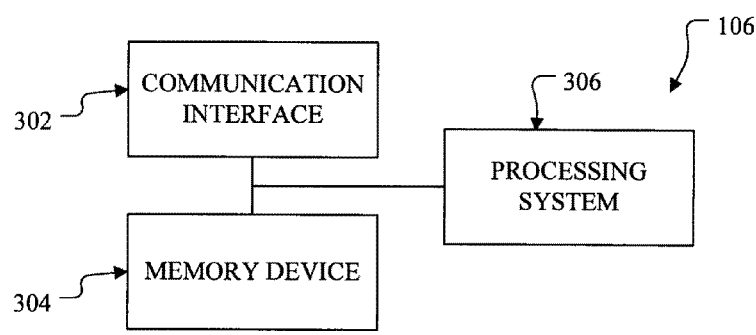

FIGS. 2 and 3 illustrate example components in the LADAR system 100 of FIG. 1 in accordance with this disclosure. In particular, FIG. 2 illustrates an example laser platform 102, and FIG. 3 illustrates an example analysis system 106. These components are simplified here for ease of explanation.

As shown in FIG. 2, the laser platform 102 includes a LADAR subsystem 202, which directs radiation towards the given area 104 and measures radiation reflected from the given area. In this example, the LADAR subsystem 202 includes a laser source 204 and transmit optics 206. The laser source 204 represents any suitable laser source generating illumination at a desired wavelength or in a desired wavelength range, such as a very narrow wavelength range. Depending on the implementation, the laser source 204 could generate radiation in the near infrared, visible, or ultraviolet spectrum. The transmit optics 206 include lenses, mirrors, or other suitable optical devices for directing radiation from the laser source 204 towards a target area, such as towards the given area 104 to be scanned.

The LADAR subsystem 202 also includes receive optics 208 and an optical detector 210. The receive optics 208 include lenses, mirrors, or other suitable optical devices for directing radiation reflected from the target area, such as from the given area 104, to the optical detector 210. The optical detector 210 measures the radiation received by the LADAR subsystem 202. The optical detector 210 includes any suitable structure for measuring radiation, such as an array of photodetectors.

In some embodiments, the subsystem 202 implements a Geiger-mode Avalanche Photodiode Detector (GmAPD) LADAR. In a conventional coherent or linear mode LADAR system, a laser source generates broad laser pulses and scans over a wide area (shown as the scan path 108 in FIG. 1). Also, a detector captures a single position on the ground per pulse and digitizes the returned pulse, possibly detecting multiple return pulses (such as from tree leaves and the ground). The waveform is thresholded to determine the time of the returns, and the range is calculated from the time of flight. This allows the system to determine where, for example, the tree leaves and ground are located.

In a GmAPD LADAR system, the laser source 204 generates narrow laser pulses, and a sensor array forming the detector 210 is over-biased so that the sensor array records the time of the first single photon detected for each pixel in the array. For every laser shot, the scan can capture a grid of points (shown in FIG. 1 as a 4×5 grid 110) per pulse. The same point can be illuminated multiple times. This allows multiple returns from the same ground post (the same position) using successive laser shots. For instance, the first shot may detect a photon reflected off tree leaves, while the next shot may detect a photon from a vehicle under the tree. This allows the possibility of foliage and camouflage net penetration.

The laser source 204 in a GmAPD LADAR system often illuminates the entire area of sensor coverage and has a lower power than that utilized by a coherent or linear mode LADAR system. Because of the lower power, the probability of detection is not necessarily 100%. Also, stray light and sensor internal noise (caused in part by over-biasing the sensor array) contribute noise to the overall system, which can be filtered out using "coincidence processing" or other suitable processing technique. Additional details regarding an example GmAPD LADAR system are found in Albota et al., "Three-dimensional imaging laser radar with a photon-counting avalanche photodiode array and microchip laser," Applied Optics, Vol. 41, No. 36, 2002 (which is hereby incorporated by reference). Coincidence processing is a statistical method that determines if a single return point is noise or a true return by counting the number of points in fixed-sized voxels. Neighborhood coincidence processing also considers points in neighboring voxels.

Information about operation of the laser subsystem 202 (such as the timing of laser shots and the receipt of reflected photons) can be used in any suitable manner. For example, the information can be provided to at least one processing system 212, stored in at least one memory device 214, and/or communicated to at least one external device or system (such as the analysis system 106) via at least one communication interface 216. The processing system 212 could simply receive the information and pass it on to the external device or system via the communication interface 216, or the processing system 212 could analyze the information (such as to generate three-dimensional images). The processing system 212 could perform any other suitable operations as needed or desired, such as authentication or encryption operations.

The processing system 212 includes any suitable processing or computing device(s) configured to process information, such as at least one microprocessor, microcontroller, digital signal processor, field programmable gate array, application-specific integrated circuit, or other device(s). The memory device 214 includes any suitable storage and retrieval device(s), such as a volatile and/or non-volatile memory. The communication interface 216 includes any suitable interface(s) configured to transmit or receive data, such as at least one wireless transceiver.

As shown in FIG. 3, the analysis system 106 includes at least one communication interface 302, at least one memory device 304, and at least one processing system 306. Information from the laser platform 102 could be received via the communication interface 302, stored in the memory device 304, and analyzed by the processing system 306. The processing system 306 could analyze the information to create three-dimensional images of the scanned area, store the images in the memory device 304, and communicate the images to an external device or system for display or storage.

In addition, as described below, the processing system 212 or 306 can implement a technique for identifying the minimum post spacing for images of an area, which can define the maximum resolution obtainable for the images of that area. Based on this, the processing system 212 or 306 can perform various functions, such as automatically generating the image with the highest achievable resolution (minimum post spacing) or informing the user of the highest achievable resolution.

The processing system 306 includes any suitable processing or computing device(s) configured to process information, such as at least one microprocessor, microcontroller, digital signal processor, field programmable gate array, application-specific integrated circuit, or other device(s). The memory device 304 includes any suitable storage and retrieval device(s), such as a volatile and/or non-volatile memory. The communication interface 302 includes any suitable interface(s) configured to transmit or receive data, such as at least one wireless transceiver.

Although FIGS. 1 through 3 illustrate one example of a LADAR system 100 and examples of components in the LADAR system 100, various changes may be made to FIGS. 1 through 3. For example, as noted above, the laser platform 102 could include any other suitable platform vehicle. Also, information collected by the laser platform 102 could be analyzed by the processing system 212 on the platform 102, the processing system 306 in the analysis system 106, or any other suitable device or system. If processed on the platform 102, the resulting three-dimensional images could be presented locally (such as to an operator on the platform 102) or communicated to an external device or system (with or without the underlying data). Similarly, if processed on the analysis system 106, the resulting three-dimensional images could be presented locally (such as to an operator in an analysis center) or communicated to an external device or system (with or without the underlying data). In addition, these figures represent one example environment where the minimum post spacing can be determined for an imaging system. This functionality could be used with any other suitable imaging system.

FIGS. 4A through 9 illustrate example details of a technique for detecting minimum post spacing in imaging applications in accordance with this disclosure. As noted above, the minimum post spacing defines the maximum resolution that can be achieved in an imaging system. The system 100 here uses various factors to determine the minimum post spacing, such as pointing and position accuracy, ground spacing distance (GSD), final post spacing, neighborhood size, and scene reflectivity. In particular embodiments, this is done using unprocessed Level 1 GmAPD LADAR data (raw point clouds) or Level 2 GmAPD LADAR data (smoothed point clouds with noise removed).

In the following discussion, assume that the pointing and position error distributions are Gaussian. That is, assume they are of the following form:

$$f(X) = \frac{e^{-\frac{x^2}{2}}}{\sqrt{2\pi}} \tag{1}$$

The probability that a random variable x falls within a 1-sigma (single standard deviation) window about the mean is as follows:

$$P(-\sigma \leq x \leq +\sigma) = \int_{-\sigma}^{+\sigma} \frac{e^{-\frac{x^2}{2}}}{\sqrt{2\pi}} dx \tag{2}$$

Solving this gives the probability of error $\epsilon$ as follows:

$$f(\varepsilon) = \frac{e^{-\frac{\varepsilon^2}{2\sigma^2}}}{\sqrt{2\pi}\, \sigma} \tag{3}$$

The shot-to-shot relative position error can be negligible, and the absolute position error can be reduced by registration to ground control points. Therefore, position error can be ignored in the analysis.

Pointing errors can contribute to location errors based on altitude and attitude of the platform 102. Pointing errors include the sensor scanning mechanism (detector 210) as well as atmospheric conditions and conditions of the platform 102. Roll, pitch, and yaw errors can come into play here. However, these conditions typically change very slowly, so for relative pointing accuracy they could be ignored since registration mitigates their affects. As a result, the error from the sensor scanning mechanism may be all that remains to be considered.

In addition to the sensor's pointing error, consideration is also made of the sensor's point spread function, which includes optical blurring $w_i(x)$ and spatial integration $a_i(x)$. Combining these two factors can yield a point spread function (PSF) of the sensor, which can be expressed as:

$$PSF_i(X) = (w_i * a_i)(X) \tag{4}$$

This equation holds up well for high dynamic range devices, and deblurring, resolution enhancement, and other known enhancement functions can also be used.

Ground Sampling Distance (GSD) can be defined as the area of ground coverage for a single sensor pixel in the array. It can be computed as follows:

$$GSD = \frac{(Altitude AGL)}{(Focal\ Length) \times (Sensor\ Spacing)} \tag{5}$$

Here, Altitude AGL refers to altitude above ground level, and Focal Length and Sensor Spacing refer to the focal length and sensor spacing of the detector 210.

Figure 4A:
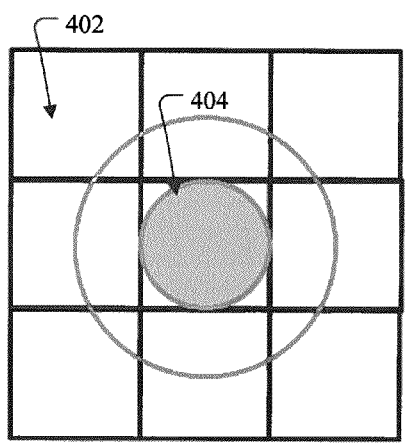
FIGS. 4A through 9 illustrate example details of a technique for detecting minimum post spacing in imaging applications in accordance with this disclosure.
Figure 4B:
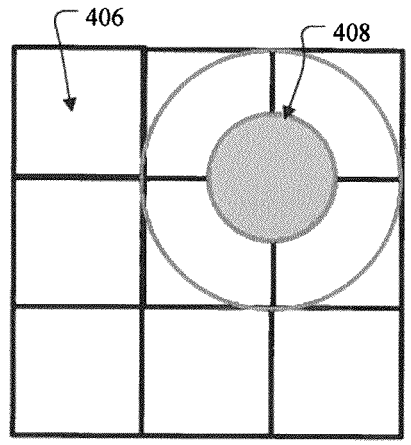

Assuming a 3×3 dilation matrix with a pixel size equal to the GSD and a fairly narrow point spread function, most of the energy from a pulse centered on a center pixel of the dilation matrix is ideally integrated into the center voxel. An example of this is shown in FIG. 4A, which shows a 3×3 dilation matrix 402 with a point reflector 404 centered in the central voxel of the matrix 402. Where the point reflector is centered near a corner of a voxel, the energy is still contained in the convolution, but the energy is almost equally spread into four adjacent voxels. An example of this is shown in FIG. 4B, which shows a 3×3 dilation matrix 406 with a point reflector 408 off-center in the matrix 406. The energy of the point reflector 408 is spread between the four adjacent voxels in the matrix 406.

Figure 5:
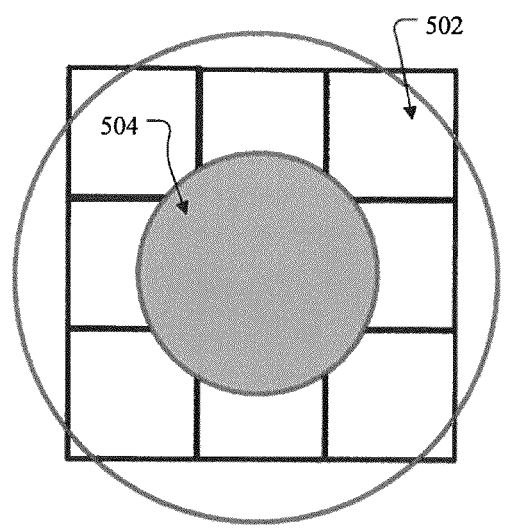

When a target is highly dispersive spatially (as opposed to in frequency), the energy can be spread out over even more voxels. An example of this is shown in FIG. 5, which shows a 3×3 dilation matrix 502 with a large spatially dispersed point reflector 504. The energy of the point reflector 504 is spread between all nine of the voxels in the matrix 502. Compensation for this could include focusing with larger correlation matrices or using sharpening algorithms.

For normal processing, the minimum post spacing that is possible (voxel horizontal resolution or "HRES") can be determined. That is, a determination is made what the minimum distance is that can be detected as a "space" between two point reflectors. Thus, the minimum theoretical resolution would be half the distance between the minimum point reflector spacing. There can also be a minimum contrast ratio of a desired value c at the center point between the two point reflectors' spread functions. Without a loss of generality, this problem can be examined in the degenerate case of a single dimension versus the intensity of two point spread functions, and it can be determined when those functions become indistinguishable. That is, from Equation (3), the distribution of two (possibly overlapping) PSFs can be determined. Then, for an arbitrary point q and assuming the centers of the PSFs are +p and −p, the following can be obtained:

$$f(q) = \frac{e^{-\frac{(+p-q)^2}{2\sigma^2}}}{\sqrt{2\pi}\,\sigma} + \frac{e^{-\frac{(-p-q)^2}{2\sigma^2}}}{\sqrt{2\pi}\,\sigma} \quad (6)$$

From this, the minimum post spacing p that provides a required contrast ratio c, for a given point spread standard deviation, can be found using the formula of:

$$\min\{p\} \mid c \leq 1 - 2 \times \frac{e^{-\frac{p^2}{2\sigma^2}}}{\sqrt{2\pi}\,\sigma} \quad (7)$$

Figure 6:
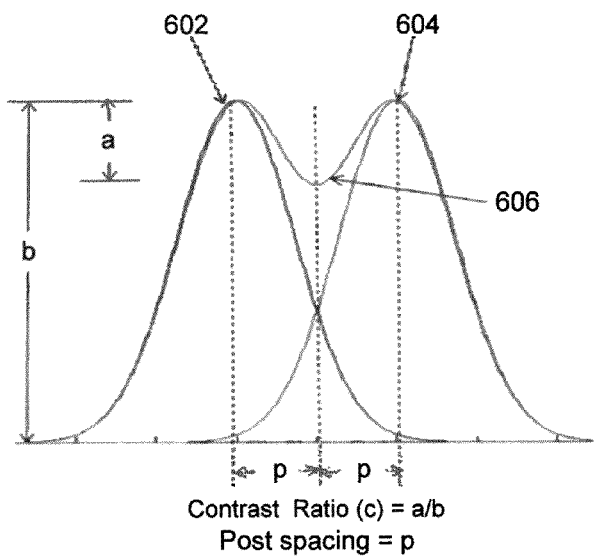

An example of this approach is shown in FIG. 6, which illustrates two PSFs 602-604 for two point reflectors and a combination 606 of those PSFs. FIG. 6 also illustrates how the contrast ratio is defined (the ratio of the depth of the trough in the combination 606 to the total heights of the PSFs 602-604). FIG. 6 further illustrates how the post spacing is defined (the distance between the high peaks of the PSFs 602-604 and the low peak of the combination 606).

The solution to Equation (7) could be determined numerically using iteration or in any other suitable manner. For example, values can be computed and tabulated for various PSF standard deviations and desired contrast ratios using a MATLAB script. Example results appear in Table 1.

TABLE 1

Minimum Post Spacing Relative to GSD

| Minimum Contrast Ratio Desired | Point Spread Sigma (distance/GSD) | | | | | | |
|---|---|---|---|---|---|---|---|
| | 0.2 | 0.3 | 0.4 | 0.5 | 0.6 | 0.7 | 0.8 |
| 0.05 | 0.23 | 0.35 | 0.46 | 0.58 | 0.69 | 0.80 | 0.92 |
| 0.1 | 0.25 | 0.37 | 0.49 | 0.61 | 0.73 | 0.85 | 0.98 |
| 0.25 | 0.28 | 0.42 | 0.56 | 0.70 | 0.84 | 0.97 | 1.11 |
| 0.5 | 0.34 | 0.50 | 0.67 | 0.84 | 1.00 | 1.17 | 1.34 |

As an example, for a system whose point spread standard deviation is measured as 0.3 GSD and a desired minimum contrast ratio of 0.1 or 10%, the minimum theoretical post spacing would be 0.37 GSD.

For systems using GmAPD or similar types of LADAR, image data can become quickly non-linear. As noted above, in these types of systems, the presence or absence of at least one photon can be detected per pixel, and coincidence processing can be used to build an image. In this case, it can be determined when the invertability of the PSF for a GmAPD sensor breaks down. This can be especially significant because of the probability of detection. Photon counting and placement is a thresholded probabilistic statistical process complicated by artificially adding a probabilistic model enforced by the random placement of a voxel-space origin, as well as the selected voxel size. For instance, when determining coincidence by a matrix dilation function, the size of the function (such as 3×3, 5×5, or 7×7) impacts the integrity of the scene, as well as the position of a point reflector in the scene.

In some embodiments, the determination of the minimum post distance may be based not only on the PSF but other factors as well. Example other factors can include (1) the number of shots per post, (2) scene reflectivity, and/or (3) the signal-to-noise ratio (SNR). In particular embodiments, the analysis may ignore the SNR and combine the first two factors into a single factor expressed as "returns per GSD unit."

Figure 7:
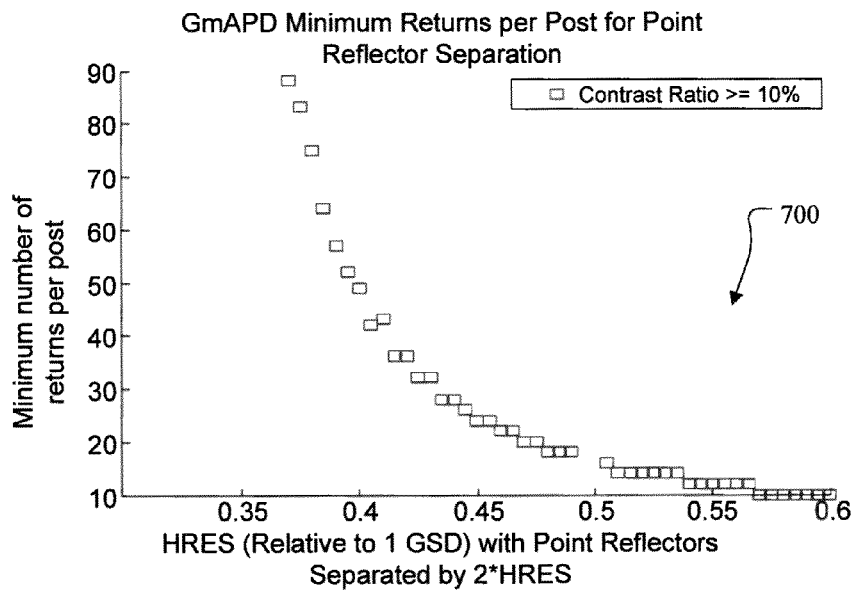

For the coincidence processing model (only counting returns in a single voxel), when the point reflectors are in the center of a voxel, FIG. 7 shows a plot 700 illustrating an example number of returns per post for a GmAPD sensor to detect an "empty" voxel between two point reflectors. For a minimum contrast ratio of 10%, the plot 700 indicates that detection needs almost 90 returns per post from the point reflectors in order to separate them from each other. The plot 700 also shows that in order to detect finer details, more shots per post are needed as the posts get smaller. This may seem intuitive, but here it has actually been quantized and can be used during image processing in various ways.

Figure 8A:
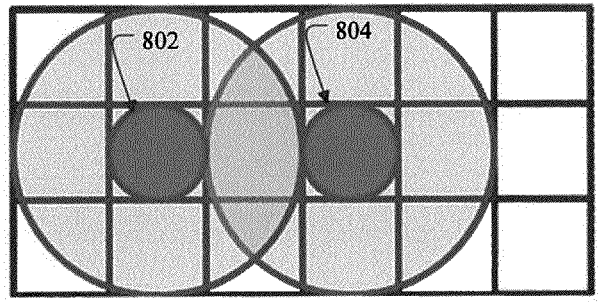
Figure 8B:
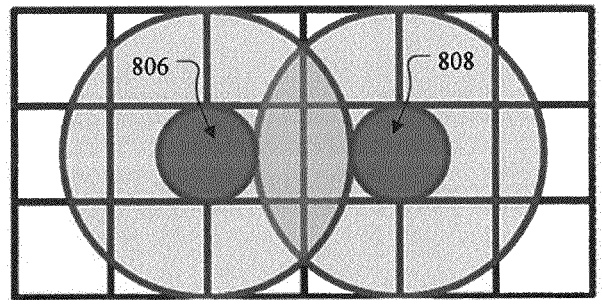

Note that this represents the best case where two point reflectors are exactly centered in their associated voxels. An example of this is shown in FIG. 8A, where two point reflectors 802-804 are centered in their associated voxels. As shown in FIG. 8B, two point reflectors 806-808 may not coincide with the centers of their voxels. When that occurs, the statistics can get much worse. To overcome this problem, processing at higher resolutions can be done, and neighborhood coincidence processing (which can "smear" the results somewhat) or the concept of "super-resolution" processing (in which the origin is moved around to create multiple pictures that are then merged together) can be used.

Figure 9:
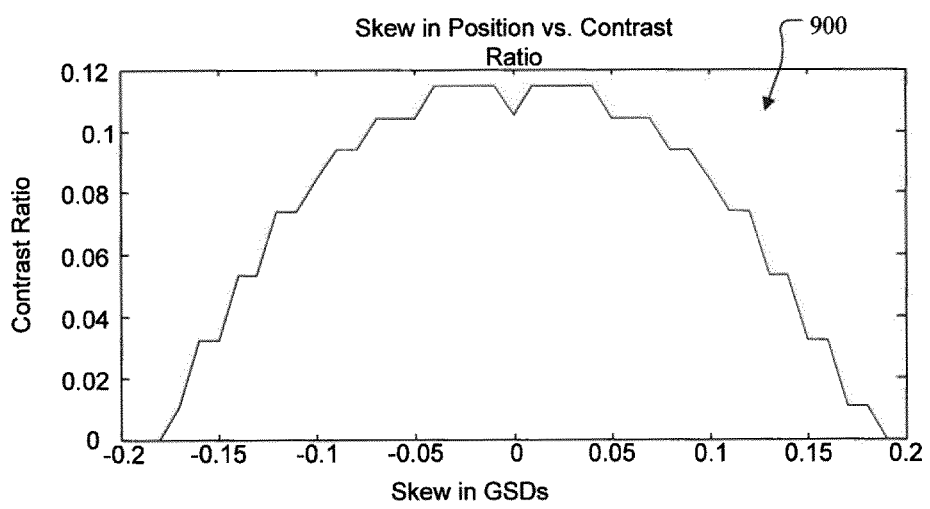

FIG. 9 illustrates a plot 900 showing contrast ratio variations as a function of power reflector position offset (skew) from the center of a voxel. In this example, the expected reduction in contrast ratio for the closest position case of 0.37 GSD with approximately 90 returns from each reflector can be seen. The center (0.0) is the best case, while the extremes (±0.18) show the worst case. FIG. 9 suggests that by slightly relaxing the contrast ratio requirement by about 0.5% and by using super-resolution with an effective resampling at 0.5 horizontal resolution (0.185 GSD), it is possible to achieve a reasonable recreation of a scene. That is, if the processing is in a "trough," moving over one-half of the post size can allow processing on a "peak." This can be seen referring back to FIGS. 8A and 8B. As a result, the minimum desired post spacing to find the maximum contrast available in the Level 1 data is half of that shown in FIG. 7.

Although FIGS. 4A through 9 illustrate example details of a technique for detecting minimum post spacing in imaging applications, various changes may be made to FIGS. 4A through 9. For example, the reflector positions and sizes shown in FIGS. 4A, 4B, 5, 8A, and 8B are for illustration only. Also, the plots shown in FIGS. 6, 7, and 9 are examples only. Other imaging systems could have different characteristics depending on their implementation.

Figure 10:
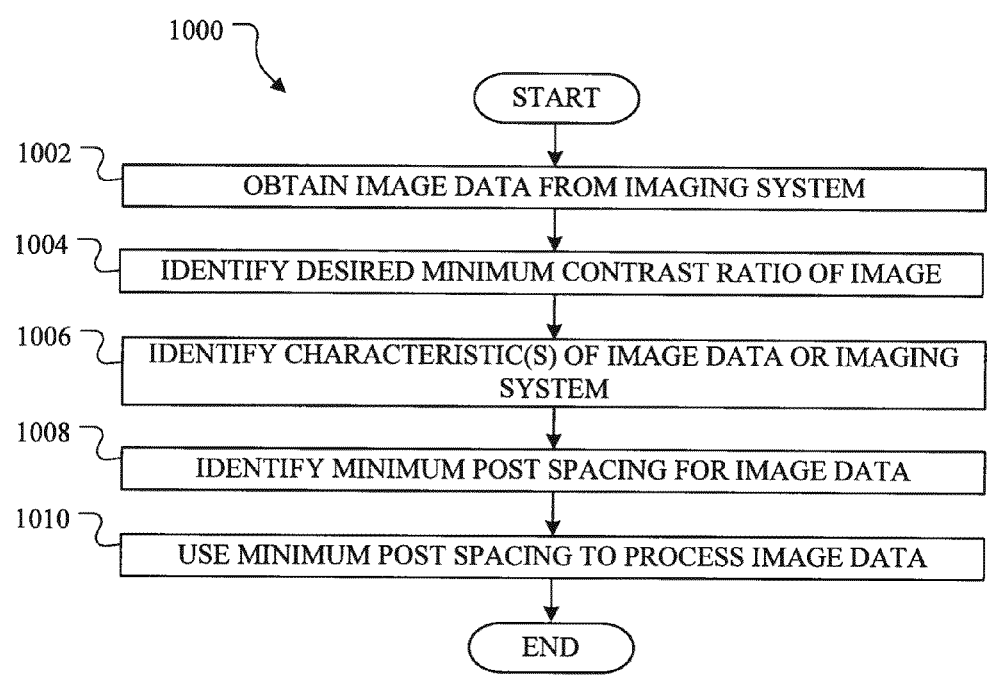
FIG. 10 illustrates an example method for detecting minimum post spacing in imaging applications in accordance with this disclosure.

FIG. 10 illustrates an example method 1000 for detecting minimum post spacing in imaging applications in accordance with this disclosure. For ease of explanation, the method 1000 is described as being performed by the processing system 212 in the platform 102 or the processing system 306 in the analysis system 106. The method 1000 could be performed by any other or additional processing systems in one or more locations.

Image data is obtained from an imaging system at step 1002. This could include, for example, the processing system 212 or 306 receiving measurement data obtained by the optical detector 210. The measurements could represent measurements associated with the first photons received by each pixel of the optical detector 210 in a GmAPD system. Other data could also be obtained, such as an identification of the time-of-flight for a laser pulse from the laser source 204 to a target and back.

A desired minimum contrast ratio of an image is identified at step 1004. This could include, for example, the processing system 212 or 306 receiving an indication from a user of the desired minimum contrast ratio. The desired minimum contrast ratio could also be predefined by a user and stored in the memory device 214 or 304 associated with the processing system.

One or more characteristics of the imaging system and/or the image data are identified at step 1006. This could include, for example, the processing system 212 or 306 identifying the point spread standard deviation associated with the imaging system or the image data. The point spread standard deviation could be expressed in terms of ground spacing distance. This could also include the processing system 212 or 306 assuming that any pointing and position error distributions are Gaussian in nature. Other possible characteristics can include the number of shots per post, scene reflectivity, SNR, and returns per GSD.

The minimum post spacing that can be obtained using the image data is identified at step 1008. This could include, for example, the processing system 212 or 306 solving Equation (7) above to identify the minimum post spacing. This could also include the processing system 212 or 306 relaxing the desired contrast ratio by a small amount and using super-processing to help handle situations where reflector points are not centered in their respective voxels. Other modifications or calculations could be performed to identify the minimum post spacing.

The minimum post spacing is used during the processing of the image data at step 1010. This could include, for example, the processing system 212 or 306 using the minimum post spacing to identify the maximum resolution obtainable using the image data. The processing system 212 or 306 could inform the user of this maximum resolution. This can help to prevent the user from requesting a resolution higher than the maximum obtainable resolution, which avoids the user wasting time and processing resources requesting a resolution that is not obtainable. The processing system 212 or 306 could also use the maximum obtainable resolution itself, such as by automatically processing the image data to create images at the maximum obtainable resolution. The minimum post spacing could be used in any other suitable manner.

Although FIG. 10 illustrates one example of a method 1000 for detecting minimum post spacing in imaging applications, various changes may be made to FIG. 10. For example, while shown as a series of steps, various steps in FIG. 10 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving image data obtained by a laser imaging system; and
   identifying a minimum post spacing obtainable in a three-dimensional image constructed using the image data, the minimum post spacing defining a maximum obtainable resolution of the image;
   wherein identifying the minimum post spacing comprises using (i) multiple point spread functions associated with the image data and (ii) a number of laser pulses directed at a specified area by the imaging system during capture of the image data.

2. The method of claim 1, wherein identifying the minimum post spacing further comprises using (iii) a minimum contrast ratio associated with the image.

3. The method of claim 2, wherein identifying the minimum post spacing comprises solving:

$$\min\{p\} \mid c \leq 1 - 2 \times \frac{e^{-\frac{p^2}{2\sigma^2}}}{\sqrt{2\pi}\,\sigma}$$

wherein p represents a post spacing, min{p} represents the minimum post spacing, c represents the minimum contrast ratio, and ±σ define a window of a single standard deviation around the post spacing p.

4. The method of claim 1, wherein the point spread functions are associated with different point reflectors, have a Gaussian distribution, and overlap.

5. The method of claim 1, wherein identifying the minimum post spacing further comprises using (iii) a ground sampling distance associated with the image data, the ground sampling distance used to identify a number of laser shots per ground sampling distance unit.

6. The method of claim 1, wherein identifying the minimum post spacing further comprises identifying a number of laser shots per post in the image data.

7. The method of claim 1, further comprising at least one of:
processing the image data to create the three-dimensional image having the maximum obtainable resolution;
notifying a user of at least one of: the minimum post spacing and the maximum obtainable resolution.

8. The method of claim 1, wherein the image data obtained by the laser imaging system comprises image data obtained by a Geiger-mode Avalanche Photodiode Detector (GmAPD) Laser Detection and Ranging (LADAR) imaging system.

9. An apparatus comprising:
at least one memory device configured to store image data obtained by a laser imaging system; and
at least one processing system configured to identify a minimum post spacing obtainable in a three-dimensional image constructed using the image data, the minimum post spacing defining a maximum obtainable resolution of the image;
wherein the at least one processing system is configured to identify the minimum post spacing using (i) multiple point spread functions associated with the image data and (ii) a number of laser pulses directed at a specified area by the imaging system during capture of the image data.

10. The apparatus of claim 9, wherein the at least one processing system is configured to identify the minimum post spacing further using (iii) a minimum contrast ratio associated with the image.

11. The apparatus of claim 10, wherein the at least one processing system is configured to identify the minimum post spacing by solving:

$$\min\{p\} \mid c \leq 1 - 2 \times \frac{e^{-\frac{p^2}{2\sigma^2}}}{\sqrt{2\pi}\,\sigma}$$

wherein p represents a post spacing, min{p} represents the minimum post spacing, c represents the minimum contrast ratio, and ±σ define a window of a single standard deviation around the post spacing p.

12. The apparatus of claim 9, wherein the point spread functions are associated with different point reflectors, have a Gaussian distribution, and overlap.

13. The apparatus of claim 9, wherein the at least one processing system is configured to identify the minimum post spacing further using (iii) a ground sampling distance associated with the image data, the at least one processing system configured to use the ground sampling distance to identify a number of laser shots per ground sampling distance unit.

14. The apparatus of claim 9, wherein the at least one processing system is configured to identify the minimum post spacing further by identifying a number of laser shots per post in the image data.

15. The apparatus of claim 9, wherein the at least one processing system is further configured to at least one of:
process the image data to create the three-dimensional image having the maximum obtainable resolution; and
notify a user of at least one of: the minimum post spacing and the maximum obtainable resolution.

16. The apparatus of claim 9, further comprising:
at least one communication interface configured to receive the image data from the imaging system.

17. A non-transitory computer readable medium embodying a computer program, the computer program comprising computer readable program code for:
obtaining image data from a laser imaging system; and
identifying a minimum post spacing obtainable in a three-dimensional image constructed using the image data, the minimum post spacing defining a maximum obtainable resolution of the image;
wherein the computer readable program code for identifying the minimum post spacing comprises computer readable program code for using (i) multiple point spread functions associated with the image data and (ii) a number of laser pulses directed at a specified area by the imaging system during capture of the image data.

18. The computer readable medium of claim 17, wherein:
the computer readable program code for identifying the minimum post spacing further comprises computer readable program code for using (iii) a minimum contrast ratio associated with the image; and
the computer readable program code for identifying the minimum post spacing comprises computer readable program code for solving:

$$\min\{p\} \mid c \leq 1 - 2 \times \frac{e^{-\frac{p^2}{2\sigma^2}}}{\sqrt{2\pi}\,\sigma}$$

wherein p represents a post spacing, min{p} represents the minimum post spacing, c represents the minimum contrast ratio, and ±σ define a window of a single standard deviation around the post spacing p.

19. The computer readable medium of claim 17, wherein the computer readable program code for identifying the minimum post spacing further comprises computer readable program code for using (iii) a ground sampling distance associated with the image data, the ground sampling distance used to identify a number of laser shots per ground sampling distance unit.

20. The computer readable medium of claim 17, wherein the point spread functions are associated with different point reflectors, have a Gaussian distribution, and overlap.

* * * * *